(12) United States Patent
Pomerene et al.

(10) Patent No.: US 8,192,638 B2
(45) Date of Patent: Jun. 5, 2012

(54) METHOD FOR MANUFACTURING MULTIPLE LAYERS OF WAVEGUIDES

(75) Inventors: Andrew T. S. Pomerene, Leesburg, VA (US); Timothy J. Conway, Gainesville, VA (US); Craig M. Hill, Warrenton, VA (US); Mark Jaso, Fairfax Station, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 360 days.

(21) Appl. No.: 12/517,692

(22) PCT Filed: Aug. 29, 2008

(86) PCT No.: PCT/US2008/074792
§ 371 (c)(1),
(2), (4) Date: Jun. 4, 2009

(87) PCT Pub. No.: WO2009/051903
PCT Pub. Date: Apr. 23, 2009

(65) Prior Publication Data
US 2010/0025364 A1 Feb. 4, 2010

Related U.S. Application Data

(60) Provisional application No. 60/999,658, filed on Oct. 18, 2007.

(51) Int. Cl.
*B29D 11/00* (2006.01)
*G02B 6/10* (2006.01)
*G02F 1/00* (2006.01)

(52) U.S. Cl. ............... 216/24; 216/2; 216/37; 216/38; 216/39; 216/41; 385/131; 385/130; 385/129; 385/132

(58) Field of Classification Search .................. 385/129, 385/130, 131, 132; 216/24, 2, 37, 38, 39, 216/41
See application file for complete search history.

(56) References Cited

U.S. PATENT DOCUMENTS
4,420,258 A 12/1983 Burns et al.
(Continued)

FOREIGN PATENT DOCUMENTS
EP 0 818 693 1/1998
(Continued)

OTHER PUBLICATIONS

Pruessner et al., "InP-Based Optical Waveguide MEMS Switches with Evanescent Coupling Mechanism", Journal of Microelectromechanical Systems, vol. 14, No. 5, Oct. 2005.
(Continued)

*Primary Examiner* — Lan Vinh
*Assistant Examiner* — David Kaufman
(74) *Attorney, Agent, or Firm* — Yudell Isidore Ng Russell; Antony Ng; Daniel J. Long

(57) ABSTRACT

A method for manufacturing multiple layers of waveguides is disclosed. Initially, a first cladding layer is deposited on a substrate, a first inner cladding layer is then deposited on the first cladding layer, and a first waveguide material is deposited on the first inner cladding layer. The first inner cladding layer and the first waveguide material are then selectively etched to form a first waveguide layer. Next, a second inner cladding layer followed by a second cladding layer are deposited on the first waveguide layer. The second inner cladding layer and the second cladding layer are removed by using a chemical-mechanical polishing process selective to the first waveguide material. A third inner cladding layer followed by a second waveguide material are deposited on the first waveguide material. The third inner cladding layer and the second waveguide material are then selectively etched to form a second waveguide layer. Finally, a fourth inner cladding layer followed by a third cladding layer are deposited on the second waveguide layer.

6 Claims, 3 Drawing Sheets

U.S. PATENT DOCUMENTS

| | | | |
|---|---|---|---|
| 4,547,072 | A | 10/1985 | Yoshida et al. |
| 4,748,617 | A | 5/1988 | Drewlo |
| 4,921,354 | A | 5/1990 | SooHoo |
| 5,165,001 | A | 11/1992 | Takagi et al. |
| 5,281,805 | A | 1/1994 | Sauer |
| 5,371,591 | A | 12/1994 | Martin et al. |
| 5,430,755 | A | 7/1995 | Perlmutter |
| 5,497,391 | A | 3/1996 | Paoli |
| 5,625,636 | A | 4/1997 | Bryan et al. |
| 5,674,778 | A | 10/1997 | Lee et al. |
| 5,703,989 | A | 12/1997 | Khan et al. |
| 5,736,461 | A | 4/1998 | Berti et al. |
| 5,828,476 | A | 10/1998 | Bonebright et al. |
| 5,834,800 | A | 11/1998 | Jalali-Farahani et al. |
| 6,117,771 | A | 9/2000 | Murphy et al. |
| 6,242,324 | B1 | 6/2001 | Kub et al. |
| 6,331,445 | B1 | 12/2001 | Janz et al. |
| 6,387,720 | B1 | 5/2002 | Misheloff et al. |
| 6,400,996 | B1 | 6/2002 | Hoffberg et al. |
| 6,477,285 | B1 | 11/2002 | Shanley |
| 6,605,809 | B1 | 8/2003 | Engels et al. |
| 6,677,655 | B2 | 1/2004 | Fitzergald |
| 6,680,495 | B2 | 1/2004 | Fitzergald |
| 6,738,546 | B2 | 5/2004 | Deliwala |
| 6,768,855 | B1 * | 7/2004 | Bakke et al. ........... 385/129 |
| 6,785,447 | B2 | 8/2004 | Yoshimura et al. |
| 6,795,622 | B2 | 9/2004 | Forrest et al. |
| 6,850,252 | B1 | 2/2005 | Hoffberg |
| 6,861,369 | B2 | 3/2005 | Park |
| 6,936,839 | B2 | 8/2005 | Taylor |
| 6,968,110 | B2 | 11/2005 | Patel et al. |
| 7,006,881 | B1 | 2/2006 | Hoffberg et al. |
| 7,010,208 | B1 | 3/2006 | Gunn, III et al. |
| 7,043,106 | B2 | 5/2006 | West et al. |
| 7,072,556 | B1 | 7/2006 | Gunn, III et al. |
| 7,082,247 | B1 | 7/2006 | Gunn, III et al. |
| 7,103,252 | B2 | 9/2006 | Ide |
| 7,139,448 | B2 | 11/2006 | Jain et al. |
| 7,215,845 | B1 | 5/2007 | Chan et al. |
| 7,218,809 | B2 | 5/2007 | Zhou et al. |
| 7,218,826 | B1 | 5/2007 | Gunn, III et al. |
| 7,259,031 | B1 | 8/2007 | Dickinson et al. |
| 7,272,279 | B2 | 9/2007 | Ishikawa et al. |
| 7,315,679 | B2 | 1/2008 | Hochberg et al. |
| 7,333,679 | B2 | 2/2008 | Takahashi |
| 7,348,230 | B2 | 3/2008 | Matsuo et al. |
| 7,356,221 | B2 | 4/2008 | Chu et al. |
| 2001/0017873 | A1 | 8/2001 | Imafuji et al. |
| 2001/0031122 | A1 | 10/2001 | Lackritz et al. |
| 2002/0021879 | A1 * | 2/2002 | Lee et al. ........... 385/129 |
| 2002/0028045 | A1 | 3/2002 | Yoshimura et al. |
| 2002/0174826 | A1 * | 11/2002 | Maydan et al. ........... 117/84 |
| 2003/0026546 | A1 | 2/2003 | Deliwala |
| 2003/0183825 | A1 | 10/2003 | Morse |
| 2004/0146431 | A1 | 7/2004 | Scherer et al. |
| 2004/0190274 | A1 | 9/2004 | Saito et al. |
| 2004/0258361 | A1 * | 12/2004 | Telkamp et al. ........... 385/50 |
| 2005/0094938 | A1 | 5/2005 | Ghiron et al. |
| 2006/0105509 | A1 | 5/2006 | Zia et al. |
| 2006/0127022 | A1 * | 6/2006 | Kim et al. ........... 385/129 |
| 2006/0158723 | A1 | 7/2006 | Voigt et al. |
| 2006/0238866 | A1 | 10/2006 | Von Lerber |
| 2006/0240667 | A1 | 10/2006 | Matsuda et al. |
| 2007/0116398 | A1 | 5/2007 | Pan et al. |
| 2007/0202254 | A1 | 8/2007 | Ganguli et al. |
| 2008/0159751 | A1 | 7/2008 | Matsui et al. |
| 2008/0240180 | A1 | 10/2008 | Matsui et al. |

FOREIGN PATENT DOCUMENTS

| | | |
|---|---|---|
| EP | 1 067 409 | 1/2001 |
| WO | 9314514 | 7/1993 |
| WO | 0127669 | 4/2001 |
| WO | 0216986 | 2/2002 |
| WO | 2004088724 | 10/2004 |
| WO | 2007149055 | 12/2007 |

OTHER PUBLICATIONS

Kik et al., "Erbium Doped Optical Waveguide Amplifiers on Silicon", MRS Bulletin 23(4), 48, Apr. 1998.

Matsushita et al., "Narrow CoSi2 Line Formation on SiO2 by Focused Ion Beam", IEEE Xplore 1999.

"Process Integration", Cobalt Self-aligned Silicide Process, Chapter 13.

Liu et al., "Design of Monolithically Integrated GeSi Electro-absorption Modulators and Photodetectors on an SOI Plaform", Optics Express 623, vol. 15, No. 2, Jan. 22, 2007.

Fijol et al., "Fabrication of Silicon-on-insulator Adiabatic Tapers for Low Loss Optical Interconnection of Photonic Devices".

Yap et al., "Integrated Opteoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Kimberling et al., "Electronic-photonic Integrated Circuits on the CMOS Platform".

Chao et al., "Analysis of Temperature Profiles of Thermo-optic Waveguides", Fiber and Integrated Optics, vol. 33.

Okyay et al., "Silicon Germanium CMOS Optoelectronic Switching Device: Bringing Light to Latch", IEEE Transactions on Electron Devices, vol. 54, No. 12, Dec. 2007.

McAulay et al., "All-optical Switching and Logic with an Integrated Optic Microring Resonator", Proc. of SPIE vol. 5814.

Warnock, Integrated Process for Silicon Nitride Waveguide Fabrication, IP.com database, IP.com# IPCOM000101202D, publication date Jul. 1, 1990, IP.com electronic publication date Mar. 16, 2005.

Kimmet, J. S., "M.S. Thesis: Integrated Circuit Fabrication Details," Rutgers University, 1999; 18 pp.

* cited by examiner

METHOD FOR MANUFACTURING MULTIPLE LAYERS OF WAVEGUIDES

PRIORITY CLAIM

The present application claims benefit of priority under 35 U.S.C. §365 to the previously filed international patent application number PCT/US08/074792 filed on Aug. 29, 2008, assigned to the assignee of the present application, and having a priority date of Oct. 18, 2007, based upon U.S. provisional patent application No. 60/999,658, the contents of both applications are incorporated herein by reference.

STATEMENT OF GOVERNMENT INTEREST

The present invention was made with United States Government assistance under Contract No. HR0011-05-C-0027 awarded by Defense Advanced Research Projects Agency (DARPA). The United States Government has certain rights in this invention.

BACKGROUND OF THE INVENTION

1. Technical Field

The present invention relates to waveguide manufacturing in general, and in particular to a method for integrating multiple layers of waveguides having uniform dielectric film thickness surrounding each waveguide.

2. Description of Related Art

Theoretically speaking, multiple waveguides can be stacked on top of each other with a thick dielectric inserted between each waveguide by using conventional complementary-metal oxide semiconductor (CMOS) back-end-of-line processing. It is important to have a uniform dielectric around each waveguide within the waveguide stack because transmission power loss can be minimized.

However, complications arise when trying to couple all the waveguide layers in a specific location and not in others. The difficulty stems from the lack of good techniques for providing sufficient etch stops and chemical mechanical polish stops. Consequently, it would be desirable to provide an improved method for manufacturing multiple layers of waveguides having uniform dielectric film thickness surrounding each of the waveguides.

SUMMARY OF THE INVENTION

In accordance with a preferred embodiment of the present invention, a first cladding layer is initially deposited on a substrate, a first inner cladding layer is then deposited on the first cladding layer, and a first waveguide material is deposited on the first inner cladding layer. The first inner cladding layer and the first waveguide material are then selectively etched to form a first waveguide layer. Next, a second inner cladding layer followed by a second cladding layer are deposited on the first waveguide layer. The second inner cladding layer and the second cladding layer are removed by using a chemical-mechanical polishing process selective to the first waveguide material. A third inner cladding layer followed by a second waveguide material are deposited on the first waveguide material. The third inner cladding layer and the second waveguide material are then selectively etched to form a second waveguide layer. Finally, a fourth inner cladding layer followed by a third cladding layer are deposited on the second waveguide layer.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
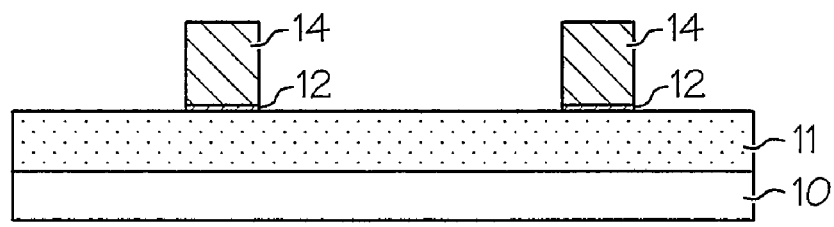
FIGS. 1a-1f are drawings illustrating successive steps of a method for manufacturing multiple layers of waveguides, in accordance with a preferred embodiment of the present invention.

Referring now to the drawings and in particular to FIGS. 1a-1f, there are illustrated a method for manufacturing multiple layers of waveguides, in accordance with a preferred embodiment of the present invention. As shown, a thick silicon dioxide layer 11 (i.e., a first cladding layer) is deposited on a substrate 10. A silicon nitride layer 12 (i.e., a first inner cladding layer) is then deposited on silicon dioxide layer 11. Silicon nitride layer 12 is preferably 25 nm thick. Next, a silicon layer 14 is deposited on silicon nitride layer 12. Silicon layer 14 is preferably 200 nm thick. Conventional etching steps are then performed using photo resist to selectively etch silicon nitride layer 12 and silicon 11 layer 14 to form a structure as shown in FIG. 1a.

Figure 1B:
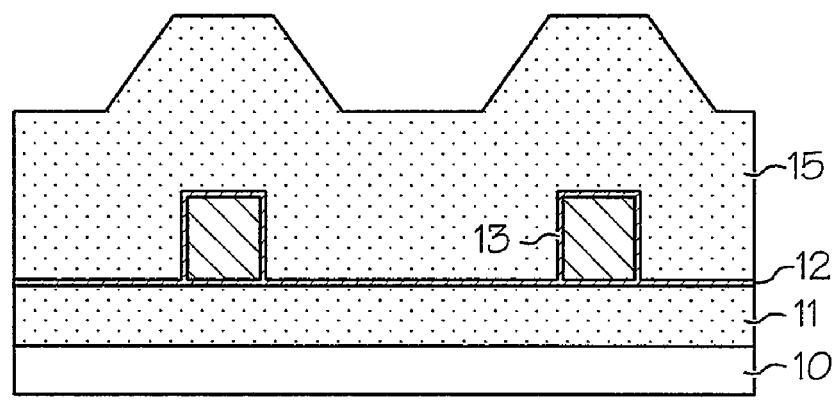

A second silicon nitride layer 13 (i.e., a second inner cladding layer) is then deposited on the structure of FIG. 1, after which a second thick silicon dioxide layer 15 (i.e., a second cladding layer) is deposited, as depicted in FIG. 1b. Silicon nitride layer 13 is preferably 25 nm.

Figure 1C:
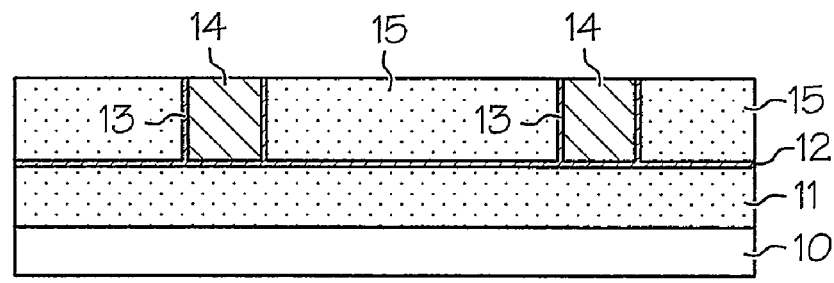

Next, second silicon nitride layer 13 and second silicon dioxide layer 15 are polished back, using a conventional chemical-mechanical polishing (CMP) process that is selective to silicon layer 14, to form a structure as shown in FIG. 1c.

Figure 1D:
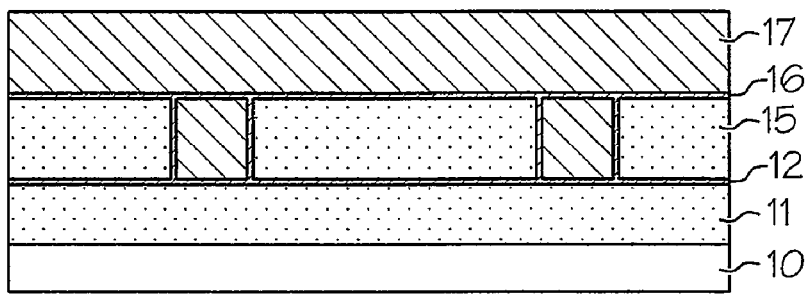

A third silicon nitride layer 16 (i.e., a third inner cladding layer) is deposited on the structure of FIG. 1c, after which a second silicon layer 17 is deposited, as depicted in FIG. 1d.

Figure 1E:
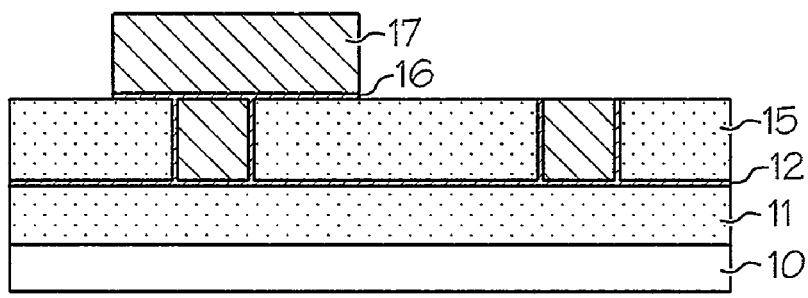

Conventional etching process is then utilized to etch second silicon layer 17 along with third silicon nitride layer 16 as etch stop between waveguides, as shown in FIG. 1e. Third silicon nitride layer 16 is then removed to ensure uniform final silicon nitride thickness around waveguides.

Figure 1F:
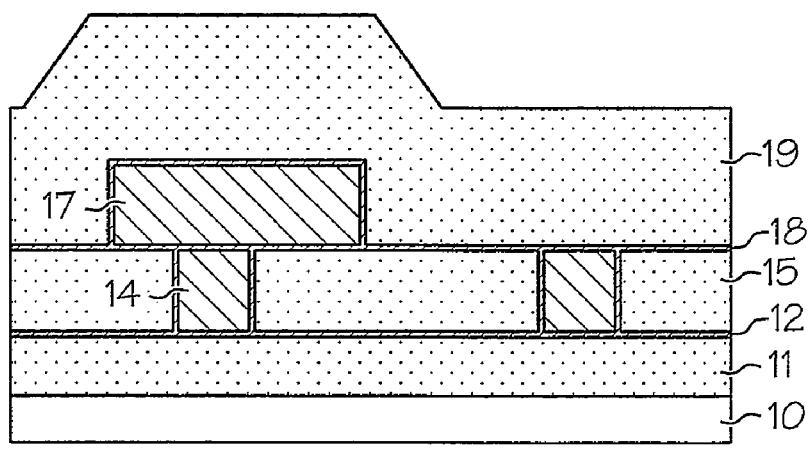

A fourth silicon nitride layer 18 (i.e., a fourth inner cladding layer) is deposited on the structure of FIG. 1e, after which a third thick silicon dioxide layer 19 is deposited on fourth silicon nitride layer 18, as depicted on FIG. 1f. As a result, a second waveguide formed by second silicon layer 17 is stacked on top of a first waveguide formed by silicon layer 14.

Figure 2A:
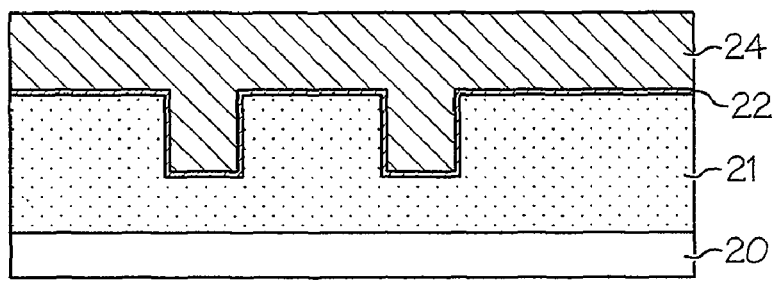
FIGS. 2a-2d are drawings illustrating successive steps of a method for manufacturing multiple layers of waveguides, in accordance with an alternative embodiment of the present invention.

With reference now to FIGS. 2a-2d, there are illustrated a method for manufacturing multiple layers of waveguides, in accordance with an alternative embodiment of the present invention. As shown, a thick silicon dioxide layer 21 is initially deposited on a substrate 20. Conventional etching process using photo resist is then applied to etch a trench in silicon dioxide layer 21. After removing the photo resist, a silicon nitride layer 22 is deposited, and after which a silicon layer 24 is deposited, as shown in FIG. 2a.

Figure 2B:
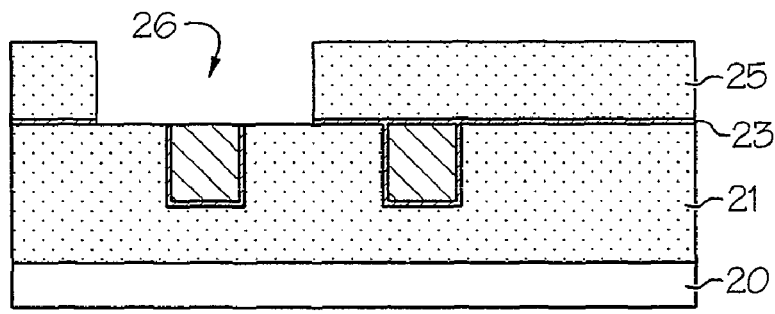

Silicon nitride layer 22 and silicon layer 24 are polished back selective to silicon dioxide layer 21 using CMP. A second silicon nitride layer 23 is then deposited, after which a second silicon dioxide layer 25 is deposited on silicon nitride layer 23. Conventional etching process using photo resist is utilized to etch a trench 26 in second silicon dioxide layer 25 and second silicon nitride layer 23 to form a structure as depicted in FIG. 2b.

Figure 2C:
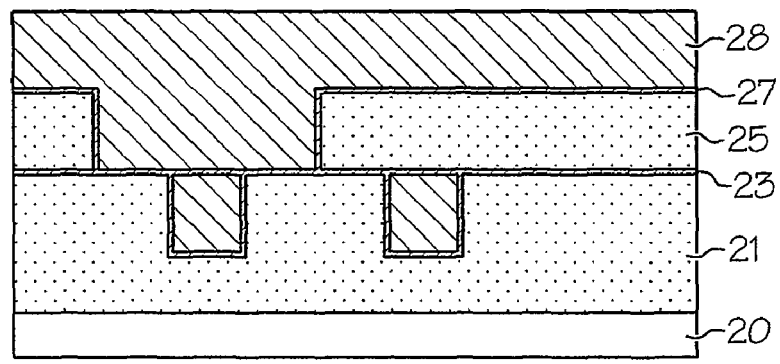

A third silicon nitride layer 27 is applied, and a second silicon layer 28 is then deposited on third silicon nitride layer 27, as shown in FIG. 2c.

Figure 2D:
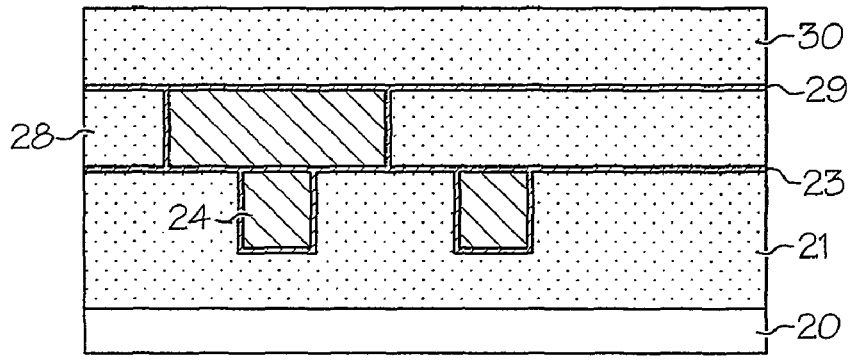

Third silicon nitride layer 27 and second silicon layer 28 are polished back selective to silicon dioxide layer 23 using CMP. A fourth silicon nitride layer 29 is then deposited. A third silicon dioxide layer 30 is then deposited on fourth silicon nitride layer 29, as depicted in FIG. 2d. As a result, a second waveguide formed by silicon layer 28 is stacked on top of a first waveguide formed by silicon layer 24.

As has been described, the present invention provides an improved method for manufacturing multiple layers of waveguides having uniform dielectric film thickness surrounding each of the waveguides. The present invention does not simply allow for stacking waveguides with dielectrics in between, but it also allows waveguides to be stacked with dual cladding layers, where the thickness of the inner cladding layer is uniform all the way around the waveguide.

While the invention has been particularly shown and described with reference to a preferred embodiment, it will be understood by those skilled in the art that various changes in form and detail may be made therein without departing from the spirit and scope of the invention.

What is claimed is:

1. A method for manufacturing multiple layers of waveguides, said method comprising:

depositing a first cladding layer on a substrate, a first inner cladding layer on said first cladding layer, and a first waveguide material on said first inner cladding layer;

selectively etching said first inner cladding layer and said first waveguide material to form a first waveguide layer;

depositing a second inner cladding layer followed by a second cladding layer on said first waveguide layer;

removing said second inner cladding layer and planarizing said second cladding layer using a process selective to said first waveguide material to expose said first waveguide material;

depositing a third inner cladding layer followed by a second waveguide material on said first waveguide material;

selectively etching said third inner cladding layer and said second waveguide material to form a second waveguide layer; and depositing a fourth inner cladding layer followed by a third cladding layer on said second waveguide layer.

2. The method of claim 1, wherein said removing is performed by a chemical-mechanical polishing process.

3. The method of claim 1, wherein said third inner cladding layer is utilized as etch stop between said first waveguide layer and said second waveguide layer.

4. The method of claim 1, wherein said first waveguide material includes silicon, germanium, silicon germanium alloy, chalcogenide glass, silicon oxynitride, erbium doped glass or silicon nitride.

5. The method of claim 1, wherein said inner cladding layers include silicon nitride, silicon oxynitride or erbimum dope glass.

6. The method of claim 1, wherein said cladding layers include silicon oxide.

* * * * *